April 27, 1948.  D. JACKSON  2,440,403
FOCUS COIL SUSPENSION FOR CATHODE RAY TUBES
Filed Oct. 24, 1946
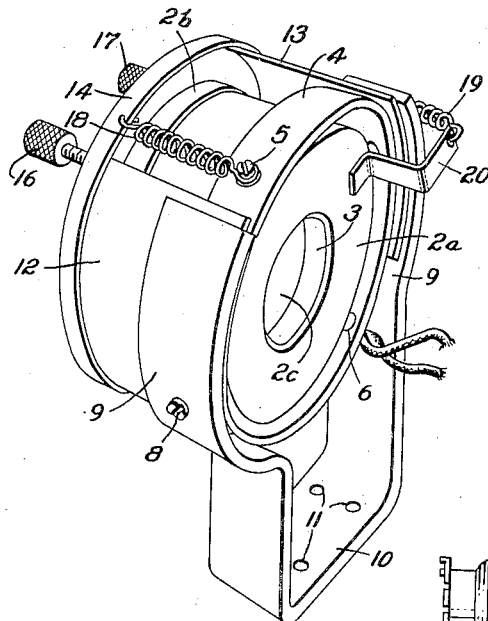
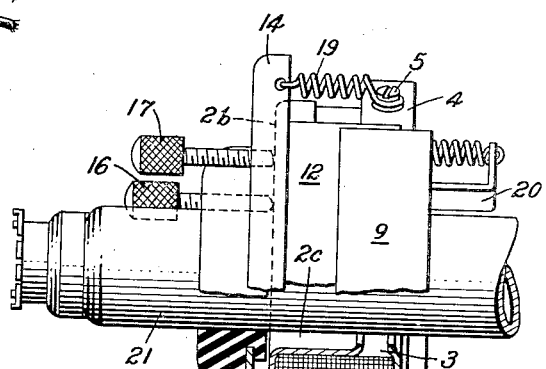
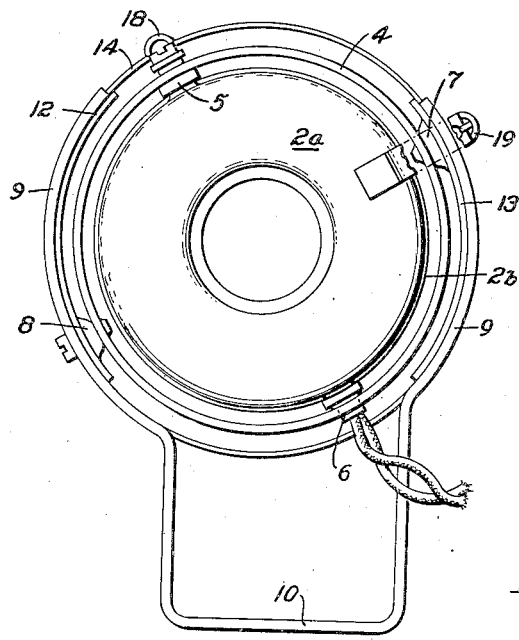
INVENTOR
DONALD JACKSON
By Emery, Holcombe & Blair
ATTORNEYS Patented Apr. 27, 1948

2,440,403

UNITED STATES PATENT OFFICE 2,440,403

FOCUS COIL SUSPENSION FOR CATHODE-RAY TUBES

Donald Jackson, Cambridge, England, assignor to Pye Limited, Cambridge, England, a British company Application October 24, 1946, Serial No. 705,286
In Great Britain October 31, 1945

5 Claims. (Cl. 250—161)

The present invention relates to a device for mounting and supporting the focus coil of a cathode ray tube, particularly for use in television receivers, whereby the focus coil may be adjusted so that the raster may assume the desired position upon the screen of the tube.

The specification of our prior British Patent No. 523,439 describes a focus coil suspension in which the focus coil is carried in a gimbal fitting, the coil being adjustable about vertical and horizontal axes. With such a mounting the raster on the screen of the tube does not move directly from right to left or up and down depending upon the axes about which the coil is turned, but moves more or less diagonally across the screen, final adjustment having to be made by manipulating the pivots.

The present invention has for its object to provide a focus coil suspension in which the raster can be moved from right to left or up and down by a simple swinging movement of the coil, and to this end the invention consists in mounting the focus coil in a gimbal fitting having the axes about which the coil can be swung arranged at such angles to the vertical and horizontal that by moving the coil about these axes the raster is moved substantially in the horizontal and vertical directions. As a result of experiments which have been carried out the axes should be arranged at approximately 30° to the vertical and horizontal directions respectively.

During the adjustment it is not necessary to manipulate the pivots of the coil, the adjustment simply being made by swivelling the coil about the two axes which may be effected, for example, by screws mounted in a back plate carried by the bracket for the gimbal mounting and having their ends engaging with the focus coil. Springs may be provided for keeping the coil in contact with the ends of the screws.

A further feature of the invention consists in suspending the focus coil about the centre of the focussing gap formed in the core of the focus coil. In this way it is possible to oscillate the coil about the two axes to deflect the magnetic field without displacing it off-centre.

In order that the invention may be more clearly understood, reference will now be made to the accompanying drawings, in which Figure 1 shows a front perspective view of a focus coil suspension according to this invention, Figure 2 shows a front elevation of the device and Figure 3 shows a side elevation, partly in section.

Referring to the drawings, the focus coil 1 is enclosed in a metal housing 2 built up of two parts 2a and 2b having the shape shown in the sectioned portion of Figure 3, the part 2b fitting over the outer surface of the part 2a and having a core portion 2c which extends through the central aperture of the focus coil. The end of this core portion 2c is spaced away from the aperture in the portion 2a to form the focussing gap 3.

The housing 2 is mounted in a ring 4 by two diametrically opposed pivots 5 and 6 whereby the housing and focus coil may be swivelled about the axis of these pivots within the ring 4. The pivot 6 is of tubular form to allow the lead-in wires to the focus coil 1 to pass therethrough.

The ring 4 itself is mounted for swinging about two diametrically opposed pivots 7 and 8 the axis of which is disposed at right angles to the axis of the pivots 5 and 6. The pivots 7 and 8 are carried by a stirrup frame member 9, which may be conveniently shaped as shown, the bottom portion 10 of this frame member being provided with apertures 11 whereby the frame may be secured to the chassis of a television receiver.

Rigidly carried from the bracket 9 by two members 12 and 13 is a back plate 14 which is apertured to allow the neck of the cathode ray tube 20 to pass therethrough and is provided with a resilient bushing 15 of rubber or like material for supporting the said neck. Passing through threaded apertures in the back plate 14 are two screws 16 and 17, the inner ends of which engage with the rear surface of the part 2b of the focus coil housing at points approximately in line with the axes of the two sets of gimbal pivots. A tension spring 18 extending from the ring 4 to the back plate 14 holds the said back surface of the coil housing in contact with the end of the screw 16, and a second tension spring 19 extending between the frame member 9 and a member 20 rigidly secured to the front surface of the focus coil housing likewise serves for keeping the back surface of the focus coil housing in contact with the end of the screw 17.

As will be clear from the front view shown in Figure 2, the axes of the gimbal pivots are not arranged vertically and horizontally but are inclined thereto at an angle of approximately 30°. By this disposition the raster is moved substantially in the horizontal and vertical directions when the focus coil is swung about one or other of the gimbal axes, thus making adjustment of the raster on the screen of the cathode ray tube very simple. By screwing the screw 16 in or out the focus coil housing together with the ring 4 may be swung about the pivots 7 and 8, whilst similar adjustment of the screw 17 causes the focus coil to swing about the pivots 5 and 6 within the ring 4 and without moving the latter.

The gimbal pivots are so disposed that their axes pass approximately through the centre of the focussing gap 3, whereby the focus coil may be adjusted about the two axes to deflect the magnetic field without displacing it off-centre.

Whilst a particular embodiment has been described, it will be understood that various modifications may be made without departing from the scope of the invention as defined by the appended claims. For example, the springs 18 and 19 may be dispensed with and replaced by two further adjusting screws passing through the back plate.

I claim:

1. Device for suspending the focus coil of a cathode ray tube comprising pivot means for swinging the coil about an axis inclined at an acute angle to the horizontal, and pivot means for swinging the coil about an axis at right angles to said first axis.

2. In combination, a focus coil for a cathode ray tube, a member surrounding said focus coil, means for pivotally mounting the focus coil in said member for movement about an axis at right angles to the axis of the coil, a support, and means for pivotally mounting said member to said support for movement about an axis at right angles to the axis of the coil and to the axis about which the coil moves with respect to said member.

3. Apparatus as claimed in claim 2, wherein the axes about which the focus coil moves lie at an angle of about 30° to the vertical and horizontal directions respectively.

4. Apparatus as claimed in claim 2, wherein the focus coil is enclosed in a housing having an annular gap in the core thereof to define a focussing gap, and wherein the axes about which the focus coil moves lie in a plane which passes approximately through the centre of the focussing gap.

5. Apparatus as claimed in claim 2, wherein the support also carries adjusting screws which engage with the focus coil or its housing, spring means being provided for holding the focus coil or its housing in contact with the ends of said screws.

DONALD JACKSON.

REFERENCES CITED

The following references are of record in the file of this patent:

UNITED STATES PATENTS

| Number | Name | Date |
|---|---|---|
| 2,131,536 | Knoll et al. | Sept. 27, 1938 |
| 2,234,720 | De Tar | Mar. 11, 1941 |

FOREIGN PATENTS

| Number | Country | Date |
|---|---|---|
| 533,439 | Great Britain | July 15, 1940 |